United States Patent [19]

Landry et al.

[11] Patent Number: 5,051,298

[45] Date of Patent: Sep. 24, 1991

[54] FILLED ARCYLATE AND METHACRYLATE FILMS

[75] Inventors: Christine J. T. Landry, Honeoye Falls; Bradley K. Coltrain, Fairport, both of N.Y.

[73] Assignee: Eastman Kodak Company, Rochester, N.Y.

[21] Appl. No.: 326,359

[22] Filed: Mar. 20, 1989

[51] Int. Cl.⁵ ............................................. B32B 5/16
[52] U.S. Cl. .................................... 428/220; 428/331; 524/493; 524/560; 264/2.6; 264/204; 264/331.18
[58] Field of Search ................................. 524/493, 560; 427/376.2; 428/331, 220; 264/2.6, 204, 331.18

[56] References Cited

U.S. PATENT DOCUMENTS

| | | |
|---|---|---|
| 3,324,055 | 6/1967 | Marks . |
| 3,324,074 | 6/1967 | McManimie ........................ 525/342 |
| 3,652,379 | 2/1972 | White et al. . |
| 3,694,399 | 9/1970 | Schwarz ............................ 264/211 |
| 3,960,805 | 6/1976 | Taylor . |
| 3,971,872 | 7/1976 | LeBoeuf . |
| 4,049,868 | 9/1977 | Laurin et al. . |
| 4,242,396 | 12/1980 | Wilson et al. ...................... 428/331 |
| 4,330,446 | 5/1982 | Miyosawa .......................... 428/447 |
| 4,442,168 | 4/1984 | White ................................ 427/387 |
| 4,820,682 | 4/1989 | Shimomura et al. ............... 428/331 |

FOREIGN PATENT DOCUMENTS 2048645 3/1971 France .

OTHER PUBLICATIONS

Clarson et al., Polym. Commun., 28, 1987, p. 249.
Stober et al., Journal of Collid and Interface Science, 26, 62–69, 1968.
Mark et al., Polymer, vol. 26, 1985, pp. 2069–2072.

Primary Examiner—James J. Seidleck
Assistant Examiner—Amara E. Lim
Attorney, Agent, or Firm—Robert A. Linn

[57] ABSTRACT

Free standing, optically clear, poly(acrylate) or poly(methacrylate) film having dispersed therein silica which is produced in situ from an alkoxysilane, using acid catalysis and a substantially stoichiometric amount of water for hydrolysis. The film forming process comprises a drying and curing step conducted in an open system. The temperatures and pH employed determine the nature and morphology of the dispersed silica phase. The film-forming process is conducted in the substantial absence of a polymerizable substance other than the alkoxysilane.

9 Claims, 3 Drawing Sheets

FILLED ARCYLATE AND METHACRYLATE FILMS

FIELD OF THE INVENTION

This invention relates to filled plastic compositions, more particularly to films made therefrom. The compositions comprise a poly(acrylate) or a poly(methacrylate) having silica particles dispersed therein. The particles are made by hydrolysis and condensation of a silicon tetralkoxide in a solution of the polymer. The size of the particles is so small that the films are optically clear. The invention comprises the films, and the process for making them.

Related Art

French Pat. No. 2,048,645 teaches the preparation of molded materials made from a solution of poly(methylmethacrylate) and tetraethylorthosilicate in methyl methacrylate monomer. As discussed more fully below, when the disclosed procedure was applied by the inventors hereof to prepare films, only poor quality products were obtained. More specifically, the films were cloudy or white, and broke up into small pieces during the curing step.

Marks, U.S. Pat. No. 3,324,055, discloses a composition comprising an organic reactive polymer, selected from a given list of various polymers, an inorganic polymer selected from a group including polysilicates, and a monomer capable of reacting with the organic and inorganic polymers. The monomeric substance polymerizes or interpolymerizes in situ to form a non-crazing, water impermable, hard adhesive coating.

White et al, U.S. Pat. No. 3,652,379, discloses a transparent polycarbonate article having a scratch resistant film comprising three layers. Two of these three layers comprise a hydrolyzed orthosilicate ester in a polymer matrix. In one layer, the polymer is a polyvinyl butyral. In the other the polymer is a polyvinyl acetate. The hydrolysis of the silicate ester is begun before it is admixed with the organic polymer.

Taylor, U.S. Pat. No. 3,960,805 discloses preparation of a composite material by reacting a monomer, e.g. a methacrylate, with prior, subsequent, or simultaneous conversion of an inorganic oxide precursor.

LeBoeuf, U.S. Pat. No. 3,971,872, discloses an abrasion resistant coating comprising a hydrolyzed silicate ester, and a polyvinyl alcohol made by hydrolyzing a polyvinyl acetate. The polyvinyl alcohol acts as an internal plasticizer and cross linking agent. An excess of water is used in the system for forming the hydrolyzed silicate ester.

Laurin et al, U.S. Pat. No. 4,049,868, discloses an abrasion resistant coating comprising a polysilicic acid ester and a polyvinyl alcohol cross-linked with formaldehyde.

Clarson et al, *Polym. Commun.* 28 (1987) 249, discloses that a higher modulus and enhanced toughness can be obtained when reinforcing particles of silica are synthesized in situ in poly(methylphenyl siloxane) via the sol-gel process, conducted in the presence of ethylamine.

Stober et al, *Journal of Colloid and Interface Science* 26, 62–69 (1968) discloses a method of controlled growth of spherical silica particles using hydrolysis of alkylsilicates and ammonia as a morphological catalyst. Particle sizes range from less than 0.05 microns to 2 microns in diameter.

Mark et al, *Polymer* (1985) Vol. 26, 2069–72 teaches in situ preparation of silica particles in poly(dimethylsiloxane). As in Clarson et al supra, the process entails swelling sheets of the polymer with tetraethylorthosilicate.

Although the prior art teaches various combinations of siliceous polymers and organic polymers, the films of this invention and the process for making them have not been disclosed in the art. A need exists for a free standing, optically clear film which does not have designed covalent linkages between an in situ produced silica oxide and a methacrylate or acrylate polymer. This invention satisfies that need by providing such films and a method for making them. In the course of work conducted by the inventors in developing their invention, it has also been shown quite unexpectedly, in spite of the lack of designed covalent linkages between the polymers employed and the silica oxide produced, that there is a strong adhesion between the organic phase and the oxide substance dispersed therein.

It has also been shown that the method of producing the silica oxide can have a profound effect on the size and morphology of the silica oxide produced. The relationships uncovered have apparently not been previously described, are unexpected, and appear to represent a significant, advance in the art.

BRIEF DESCRIPTION OF THE DRAWINGS

Comparison of FIGS. 1 and 2 demonstrated the gross differences in silica morphology when the silica is prepared by the process of this invention, and by a similar process in which base catalysis is used. Comparison of FIGS. 1 and 3 show the decided differences between composite films of this invention, and films made from composites prepared according to the prior art process of the French Patent.

SUMMARY OF THE INVENTION

This invention relates to films of a filled polymer composition comprising (a) a poly(acrylate) or poly(methacrylate) binder having substantially uniformly dispersed therein (b) particles of an in situ produced, alkoxysilane derived, silicon oxide. The particles have a size less than about 0.1 microns so that the films are optically clear. The concentration of particles in the film is in the range of from about 10 to about 65 weight percent, based on the weight of polymer. The films preferably have a thickness of from about 1 to about 500 microns.

Films of this type are made by (i) hydrolyzing and condensing a tetralkoxysilicate in an organic solution of the polymer, using acidic conditions and a stoichiometric or substantially stoichiometric amount of water for hydrolysis, and (ii) subsequently coating the composition thereby produced on a surface, and drying and curing the coat on the surface to produce the film, which then can be removed from the surface if desired. An open system, rather than a closed mold, is employed during the film forming step.

The preferred films of this invention are free standing, i.e. they are not permanently bonded to the surface on which they were formed, like a paint or varnish. Thus the films of this invention are self-supporting flexible sheets. They may be used as protective materials. They may also be used as optically clear matrices for dyes and colorants. The silica component acts as a reinforcing agent and imparts one or more of the following to the film: hardness, compressive strength, higher heat distortion temperature, high rubber modulus, lower thermal expansion coefficient, or one of the other enhanced properties suggested by the detailed description below.

DESCRIPTION OF PREFERRED EMBODIMENTS

In one embodiment, this invention relates to optically clear films comprising a poly(acrylate) or poly(methacrylate) as an organic binder, having substantially uniformly dispersed therein silicon oxide particles of a size less than about 0.1 micron. Preferably, the films have a thickness of from about 1 to about 500 microns. There is no designed covalent linkage between the silicon oxide particles and the polymeric binder. In spite of this, the mechanical behavior of composites of this invention indicate there is strong adhesion between the organic phase and the silicon oxide dispersed therein.

The silicon oxide particles in the films of this invention are produced in a solution of the polymer, by hydrolysis and condensation of a tetralkoxysilicate. As shown by work conducted in connection with development of this invention and discussed below, the morphology and size of the silica particles is dependent upon the method of film formation. For example, there appears to be some degree of interpenetration of polymer chains with the $SiO_2$ network, which occurs when the method of this invention is employed. Consequently, it appears that the products of this invention differ from products that could be made by admixing preformed silicon oxide particles into the polymer matrix.

As stated above, there is no designed covalent interaction between the organic and inorganic phases in the films of this invention. Thus, the products of this invention differ from materials prepared by methods in the art which incorporate highly cross-linked inorganic networks into organic polymer matrices:

(a) by reacting an orthosilicate directly with end-capped organic polymers to provide a connection (through chemical bonding) between the organic phase and the inorganic phase which is formed, or (b) by the hydrolysis and condensation of alkoxysilane monomers containing a polymerizable organic moiety covalently attached to the silicon, and the subsequent polymerization of the organic moiety.

In another embodiment, this invention provides a process for preparing the films discussed above, said process comprising hydrolyzing and condensing an alkoxysilane in an organic solvent solution of a poly(methacrylate) or poly(acrylate) by using an acidic catalyst and a stoichiometric or substantially stoichiometric amount of water for hydrolysis, and subsequently drying and curing a film of the resultant intermediate product in a system open to the atmosphere. This process is conducted in the absence or substantial absence of any polymerizable organic substance. Thus, no polymerizable organic monomer such as an acrylate or methacrylate monomer is intentionally added to the mixture in which the silica particles are produced.

The preparation of films of this invention has been demonstrated using poly(methyl methacrylate) herein designated by the acronym PMMA. The utility of that substance suggests that similar films can be made using other polymers of lower alkyl esters of acrylic, or methacrylic acid. (For the purpose of this invention, the term "lower alkyl" means alkyl radicals of from one to about four carbon atoms.)

Polymers of straight chain lower alkyl acrylates and methacrylates are preferred; however, polymers of branched esters such as isopropyl-, sec-butyl-, and tert-butylmethacrylate and acrylates can be used, if desired. The acrylates and methacrylate polymers used in this invention need not be homopolymers. Thus, the polymers may contain small amounts of modifying acrylate and/or methacrylate.

Likewise, the polymers may be block copolymers. For example, the polymers may be methyl methacrylate/ethyl acrylate copolymers, methyl methacrylate/butyl methacrylate copolymers, and methyl methacrylate/methyl acrylate, or methyl methacrylate/butyl acrylate copolymers. Mixtures of such polymers can be employed, if desired.

For the process of this invention, a poly(acrylate), or poly(methacrylate), is dissolved in a solvent. Preferably, the concentration of the polymer in the solvent is in the range of from about 1.0 to about 50 weight percent; more preferably from about 5 to about 25 weight percent. It is to be understood that the relative amounts of solvent and polymer are not critical, and concentrations somewhat outside the range of 1–50% can be used, if desired.

Solvents selected for use in this invention have sufficient solvent power for the polymer(s) and alkoxysilane(s) used in the compositions, to afford solutions having the desired solute concentrations. Secondly, applicable solvents are inert, or substantially inert, toward the other ingredients present, under the conditions employed in the film forming process. Thirdly, the solvents are miscible with water, to the extent necessary to prevent phase separation when the polymer/solvent/alkoxysilane mixture is admixed with the water acid catalyst mixture, and/or the water produced by the condensation of silanol groups in the hydrolyzed alkoxysilane. Fourthly, the solvents are relatively low boiling, and have a fairly high volatility, so that they can be fairly readily removed by the curing step discussed below. Solvents having these properties generally:

(1) can dissolve 1–50 weight percent or more of the polymer or mixture of polymers used, (2) can dissolve or be miscible with said alkoxysilane,
(3) are reasonable miscible with up to about 4 moles of water, based on the moles of alkoxysilane, and
(4) have a boiling point (STP) less than about 160° C.

Applicable solvents are exemplified by tetrahydrofuran, dioxane, acetone, methyl ethyl ketone, methyl acetate, ethyl acetate, dichloromethane, N,N-dimethylformamide, and other amides, ethers, ketones, esters, and halogenated hydrocarbons, and other materials having the properties discussed above.

There is no critical aspect pertaining to the mixing of the polymer and solvent. The polymer/solvent mixture can be stirred if desired to facilitate solution. Likewise, the mixture can be warmed to enhance the rate of solution. The polymer can be added to the solvent before, or at the same time, or after the alkoxysilane is added to the solvent.

The alkoxysilanes used in this invention have the formula $Si(OR)_4$, wherein each R is alike or different, and is selected from the class consisting of lower alkyl radicals, i.e. alkyl radicals having up to about four atoms. Of these, tetraethylorthosilicate and tetramethylorthosilicate are preferred. These materials are used in the starting composition in an amount sufficient to yield from about 10 to about 65 weight percent (calculated as $SiO_2$) of the final film composition of this invention. Concentrations somewhat outside this range can be employed.

For this invention, the solvent/polymer/tetralkoxysilane mixture is treated with a stoichiometric amount of water (4 moles of water per mole of alkoxide) or a substantially stoichiometric amount. For the purpose of this invention, a "substantially stoichiometric" amount means a stoichiometric amount, plus or minus the amount of water within the normal processing error. In many instances, the substantially stoichiometric amount is the stoichiometric amount, plus or minus about 10% by weight. Preferably, the water contains the acid catalyst. A 0.01 to 2.5 molar solution of acid, preferably 0.10 to 1.25 molar, is usually employed. Hydrochloric acid or other volatile acid such as acetic acid, propionic acid, and the like can be used. Hydrochloric acid is preferred.

Acid catalysis is preferred over basic catalysis. As shown below, films made from base catalyzed material were opaque. Furthermore, it has also been found that films of this invention made by acid catalysis have a higher glass transition temperature than films made by using base catalysis. Moreover, it has also been observed that for acid and base-catalyzed films having the same thermal history, that the base catalyzed film had a greater amount of residual tetraethylorthosilicate than the acid-catalyzed material. These comparisons are discussed in more detail below.

After the water and catalyst have been added to the solvent/polymer/alkoxysilane mixture, the resultant material is thoroughly mixed. Mixing can be conducted at ambient temperature or at a temperature slightly below or above ambient, e.g. 10° C. to about 35° C. This range is not critical, and temperatures somewhat outside this range can be employed. Mixing is usually conducted for from 3 to about 24 hours, preferably 10 to 20 hours.

After mixing, the resultant solution is coated on a coating surface. The technique of applying the coating is not critical, and any method known in the art can be used. Knife coating and spin coating are examples of applicable coating techniques. Other analogous coating methods can also be used.

The coatings are produced on a surface from which the cured film of this invention can be removed, after curing. For the coating to be removed, the coating must not permanently adhere to the surface on which the coat is formed. It has been found that a polyimide surface such as Kapton resin, or a similar polyimide, can be used. It appears that other materials that are somewhat hydrophobic, e.g. polyester and polyethylene can also provide applicable "non-sticking" surfaces for the coating step of this invention. Also, the composites of this invention can be used as coatings, if desired.

To prepare an optically clear, (i.e. transparent) film, the coating solution is applied (in a system open to the atmosphere i.e. not in a closed mold) to a non-sticking surface maintained at a temperature slightly above ambient, e.g. 30°-35° C. When such a temperature is used, the coating solution vitrifies fairly rapidly (e.g. within from about 1 to about 20 minutes) after being applied to the surface. The temperature selected for coating will depend at least to some extent on the nature of the solvent, the rate of evaporation of the solvent, and the thickness of the film. As discussed below, vitrification is believed to render the silica particles, (produced by the hydrolysis/condensation process) immobile or substantially immobile; thereby preventing agglomeration into particles which become so large, that the resultant film is opaque.

Vitrification occurs by removal of solvent and other volatile liquids from the coating solution. However, for this invention it is important that the rate of solvent removal be slow enough to prevent bubble formation. Bubbles have an adverse effect on the films, e.g. they detract from the optical clarity, uniformity, and/or strength. In this regard, our work has demonstrated that good films are generally produced when the initial temperature of the coated surface is 30°-35° C. and the coating is dried at that temperature for from 0.25 to 2 hours, and then cured under full pump vacuum at a temperature of from about 60° C. to about 200° C., for from about 1 to 10 days. Preferred curing temperatures are in the range of from about 90° C. to about 150° C.

It is to be understood that there is no real lower limit on the curing temperature; lower temperatures merely require longer cure times.

To prevent bubble formation, temperatures at or near the solvent boiling point should not be used when there is an appreciable amount of solvent remaining in the film composition. However, temperatures about or approaching, or somewhat above the solvent boiling point can be used near the end of the curing period. Thus, it is not necessary to use the same temperature throughout the curing period. One may use different temperatures; e.g. a stepwise or continually increasing temperature rate during the curing period. The rate of temperature increase need not remain constant; thus, a faster rate may be used during a later phase of the curing step, if desired. Above it was stated that vacuum pressures were used in preparing films of this invention. It is to be understood that reduced pressures are not required, and that they are an optional expedient for the drying and curing of the films. Reduced pressures shorten the time required to remove volatiles from the film-forming mixture. Hence, pressures less than ambient are preferred but not critical. Ambient and higher pressures can be used if a longer dry/cure step is desired.

As apparent to a skilled practitioner, the solids content of the solution applied to the non-sticking surface affects the thickness of the film that will be produced.

Since solvent is present, there will most always be some shrinkage from the thickness of the coat applied as a liquid to the non-sticking surface. For thicker films, one generally employs a film-forming liquid having a higher solids loading, i.e. more solid dissolved in the liquid phase. When preparing thicker films, the use of reduced pressures to remove volatiles is highly preferred.

Although not bound by any theory, it appears that the properties and morphology of the films of this invention, appear to be largely dependent upon (a) the pH at which the hydrolysis/condensation is conducted, and (b) the rate of vitrification mentioned above. In the compositions of this invention, low molecular weight alkoxides are converted to an $SiO_2$ network. This process is occurring within a polymeric, glassy matrix: e.g. PMMA. Initially the $T_g$ of the system is low due to the presence of solvent molecules which plasticize the polymer, and the polymerization of the inorganic network proceeds rapidly. However, as the solvent evaporates during the coating and curing procedure, the mobility in the system decreases, the $T_g$ increases, and eventually the system vitrifies. Vitrification occurs when the glass transition temperature of the system equals the coating temperature, $T_{coat}$, or the temperature of cure, $T_{cure}$.

Turning now to the hydrolysis and condensation of the alkoxide, several reactions in these processes occur simultaneously. The relative rates of some or all of these reactions is pH dependent. Hence, the pH will greatly affect the overall result obtained from the chemical transformations, and therefore have a profound influence on the composition of the silica phase produced. Therefore, it is important to use an acidic hydrolysis/condensation media, as taught above.

The coating and curing temperatures also influence the thermodynamic and kinetic factors involved in the hydrolysis and condensation processes. Furthermore, these temperatures affect the rate of solvent evaporation. Hence, they determine the dimension (size) of the dispersed phase in the film products. The coating temperature will have an effect on the particular silica morphology produced. After vitrification the curing temperatures will increase the extent of reaction of the inorganic phase, without substantially altering the particle morphology.

For most organic systems, full cure will be obtained above the cure temperature employed. Stated another way, pure, fully densified $SiO_2$ will not be obtained until the temperature is raised to above 1000° C. Such high temperatures are above the degradation point of most organic polymers, and they therefore are preferably not employed in this invention. Consequently, the inorganic phase within the films of this invention may be an impure and/or not fully densified silica. The composition of the silica in the films of this invention have not been determined; however as indicated above, the silica phase need not conform exactly to the formula $SiO_2$.

Experimental

Materials

The poly(methyl methacrylate) employed was Plexiglas V(811)-100 from Rohm and Haas Co. and had a $M_w = 79,000$ g/mole and a $M_n = 44,000$ g/mole (in polystyrene equivalents) as determined by size exclusion chromatography in THF. The alkoxide used was tetraethoxysilane (TEOS) which was obtained from Fluka Co. The solvent was tetrahydrofuran (THF) which was reagent grade and was obtained from J. T. Baker, Inc. All reagents and solvents were used as received unless otherwise noted.

All samples were prepared by dissolution of the PMMA in THF at a concentration of 20 weight percent. TEOS was added directly to the solution under continuous agitation. The TEOS was well dispersed and the solution became clear within a few minutes. Then a stoichiometric amount of water per alkoxide (4 moles based on Si), either as 0.15M HCl or 1M $NH_4OH$, was added, and the solution was mixed for 16 hours at ambient temperature. The solutions were then knife coated onto sheets of Kapton-H resin mounted on a temperature controlled coating block. All coatings were dried and cured under vacuum at elevated temperatures. The exact conditions used to prepare samples for dynamic mechanical analysis and electron microscopy are listed in Table I.

The nomenclature adopted herein specifies each sample as follows:

PMMA - 33A - 30 (- 90), where
- is the temperature of highest cure, in °C. (not always included in the sample name)
- is the coating temperature, in °C.
- A for acid catalyzed, B for base catalyzed
- mole % TEOS, based on moles of MMA monomer unit
- organic polymer Therefore, a sample prepared by adding an amount of TEOS equal in weight to that of PMMA would result in a film containing 33 mole % TEOS (or 33 mole % $SiO_2$); this is equivalent to 22.4 weight % $SiO_2$, assuming total conversion of the TEOS to $SiO_2$.

As indicated by Table I, samples with varying amounts of TEOS were prepared as above. The coating temperature was varied for several acid catalyzed 50/50 (w/w) mixtures of PMMA/TEOS. Also, a few base catalyzed samples were prepared for which the time between adding the water/catalyst mixture and solution coating was varied. PMMA-33B-30a was coated immediately after the addition of 1M $NH_4OH$, PMMA-33B-30b was coated after 1.5 hours, and PMMA-33B-30c was coated after 3 hours. PMMA-33B-30 was coated after 16 hours as described above.

TABLE I

PMMA/TEOS Sample Composition and Preparation

| Sample | Calculated Composition | | Catalyst | Coating Temperature (°C.) | Appearance |
|---|---|---|---|---|---|
| | mole % TEOS (1) | Weight % $SiO_2$ (2) | | | |
| PMMA-33B-30 | 33 | 22.4 | 1 M $NH_4OH$ | 30 | white |
| PMMA-33B-30a | " | " | " | " | " |
| PMMA-33B-30b | " | " | " | " | " |
| PMMA-33B-30c | " | " | " | " | " |
| PMMA-53A-30 | 53 | 40.2 | 0.15 M HCl | 30 | transparent |
| PMMA-33A-30 | 33 | 22.4 | " | 30 | " |

TABLE I-continued
PMMA/TEOS Sample Composition and Preparation

| Sample | Calculated Composition | | Catalyst | Coating Temperature (°C.) | Appearance |
|---|---|---|---|---|---|
| | mole % TEOS (1) | Weight % SiO$_2$ (2) | | | |
| PMMA-33A-19 | 33 | 22.4 | " | 19 | opaque |
| PMMA-33A-11 | 33 | 22.4 | " | 11 | " |
| PMMA-24A-30 | 24 | 16.1 | " | 30 | transparent |
| PMMA-17A-30 | 17 | 11.0 | " | 30 | " |
| PMMA-11A-30 | 11 | 6.7 | " | 30 | " |

(1) Based on moles of PMMA-monomer.
(2) Assuming total conversion of TEOS to SiO$_2$.

Measurements

Differential scanning calorimetry (DSC) was performed with a Dupont 990 thermal analyzer, equipped with a data analysis program by Laboratory zicro Systems, Inc. The heating rate used was 20° C./minute. The glass transition temperature, $T_g$, was taken as the onset in the change in heat capacity.

Dynamic mechanical measurements (DMS) were obtained using a Rheovibron DDV-II dynamic tensile tester (Toyo Measuring Instruments, Ltd., Japan) automated by IMASS, Inc. The data were obtained at frequencies of 1.1, 11.0, and 110.0 Hz, using a heating rate of 1.5° C./minute.

Transmission electron microscopy (TEM) was performed on thin (800-1200 Å) sections using a JEOL JEM 100CX-II (JEOL Ltd., Tokyo, Japan) transmission electron microscope. The final print magnifications were between 7800× and 100,000×. The samples were microtomed with an LKB Ultrotome V ultramicrotome (LKB Produkter AB, Sweden) perpendicular to the coating direction so that each image represents a cross-section through the thickness of the film. The intrinsic contrast between the organic polymer and the SiO$_2$ network was sufficient, and no staining was required.

The third dimension in the shape of the inorganic domains, observed by TEM, for some samples was obtained by the following procedures. The first involved placing the composite in a centrifuge tube with an excess of toluene to dissolve the PMMA. After several hours, the sample was sonicated for 2 hours in a warm water bath and centrifuged for 10-20 minutes. The toluene was removed and a fresh aliquot of toluene was added to the sample and left overnight. The sonication and centrifugation processes were then repeated, most of the toluene removed, and a drop of the remaining solution-which contained the SiO$_2$ domains-spotted onto a silicon wafer and dried. The sample was then plasma ashed for a total of 8 minutes in 2 minute intervals with 2 minute cool times. Finally, the sample was coated with 3 nm of gold-palladium and photomicrographed with a JEOL JSM-35C (JEOL Ltd., Tokyo, Japan) scanning electron microscope (SEM). The second procedure involves cutting the film into four equal size pieces. These were stacked and glued together with five minute epoxy. The stack was then embedded in Epon 812 in a pyramid mold as follows. Some Epon was placed on the bottom of the mold. After it had begun to cross-link, the stack was positioned on top of it and the mold was filled with Epon. This procedure allowed the stack to remain flat. After hardening the Epon overnight at 50° C., the resulting plug was mounted in a microtome chuck and sections, parallel to the initial film coating direction, were cut with a diamond knife. The results obtained by this later method verified that the first procedure did not alter the macrostructure of the inorganic domains.

Results

Differential Scanning Calorimetry and Dynamic Mechanical Spectroscopy

The DSC and DMS results indicate that the $T_g$ of the material is not greatly changed by the presence of the inorganic phase. The principal effect on the observed behavior of $T_g$ is one of initial plasticization of the PMMA by residual small molecules from the sol-gel reaction: moieties with very low degrees of polymerization such as monomers and dimers. This indicates incomplete curing of the inorganic phase. The exact values for $T_g$ depend on the complete thermal history: coating conditions, drying, and curing. The $T_g$ of the material can be increased towards its limiting value by curing at elevated temperatures. For the particular system studied, annealing the sample above 130° C. for a sufficient amount of time also leads to a value of $T_g$ which approaches this limiting value. The limiting value is very close to that of PMMA for the base catalyzed composite and is slightly higher, for the acid catalyzed composite. The breadths of the DSC transition and the Tan δ alpha peak are broader for the TEOS-containing PMMA than for pure PMMA, particularly in the case of the acid catalyzed samples.

Dynamic mechanical spectra for samples PMMA-33A-30 and PMMA-33B-30 were obtained; both samples had been cured for 5 days at 90° C. under vacuum. These were compared to the spectrum of pure PMMA. Below $T_g$ the curves for the different samples were all very similar. The $T_g$ of both composite samples was slightly depressed relative to pure PMMA, with the base catalyzed sample having the lowest $T_g$.

The base catalyzed samples were analyzed for residual volatiles by head space gas chromatography; the incubation was performed at 150° C. The results show that on a relative scale the base catalyzed sample contained several weight % residual TEOS, whereas the acid catalyzed sample had less than 50 ppm. Additionally, the head space chromatography results indicated that there is a few weight % THF remaining in this acid catalyzed sample. No residual solvent was detected in the base catalyzed sample. Raman studies confirm these observations.

The predominant difference in the dynamic mechanical behavior of the two composites was the presence of a rubberlike plateau at temperatures above $T_g$, having a modulus of log $E' > 8.5$ dynes/cm$^2$, observed for the acid catalyzed composite, whereas the base catalyzed sample enters the flow regime after going through $T_g$. Sample PMMA-33B-30a, coated immediately after the addition of the base catalyst, also entered the flow regime after passing through $T_g$. The most striking difference in the visual appearance of these samples was optical clarity; the base catalyzed samples were opaque whereas the acid catalyzed sample was optically clear, suggesting the presence of much smaller silicon dioxide domains in the latter.

The acid catalyzed composites were usually prepared in such a way as to obtain optically clear films. This was accomplished by coating the solution onto a temperature controlled block maintained at, or above, 30° C. If the temperature of the coating block was reduced, cloudy films were obtained. In order to probe differences in morphology and mechanical properties which may arise from varying the sample preparation, samples were coated at 11° C. and 19° C. (see Table II), keeping all other conditions constant. Their dynamic mechanical properties were obtained. No plateau modulus above $T_g$ was observed for the opaque samples, although the E' curve for the sample cast at 19° C. has a slight hint of the beginning of a plateau. Only the clear sample, cast at 30° C. shows a plateau modulus. All these samples were cured at 90° C. for 2½ days and have essentially the same $T_g$. Further curing of the opaque samples increases the $T_g$ but does not promote the development of a rubber plateau. The shift in $T_g$ for the sample cast at 11° C. after further curing at 160° C. for 2½ days was determined. For this composite, the maximum in the Tan δ curve, at 11 Hz, occurs at 147° C. This is slightly higher than that for pure PMMA, which occurs at 140° C.

A rubber plateau above $T_g$ was also observed for the composite prepared with 53 mole percent TEOS, sample PMMA-53A-30. For this sample, cured at 90° C. for 63 hours under vacuum, the magnitude of the plateau modulus did not differ from that observed for the sample prepared with 33 mole percent TEOS, cured under the same conditions. However, as observed for PMMA-33A-30, the plateau modulus distinctly increased in magnitude as the temperature increased. It was possible to obtain DMS results on sample PMMA-53A-30 after it had been heated to 200° C. although the material became extremely brittle after this treatment. The value of the plateau modulus had increased to $10^9$ dynes/cm$^2$. These results are evidence that the increase in E' with temperature, above $T_g$, is a least partially due to further curing of the material. The maximum in the Tan δ peak has shifted to about 160° C.; this value is also obtained when the sample is cured at 130° C. The amplitude of the loss peak decreases as a function of cure.

The loss peak at the glass transition provided molecular information about the heterogeneity of the system. The Tan δ peak was quite sharp for pure PMMA. However, when the TEOS was added and polymerized, the breadth of the peak increased. This was particularly pronounced for the acid catalyzed samples. Also, the magnitude of Tan δ at the peak decreases with SiO$_2$ content and with extent of cure for the acid catalyzed samples. These results are tabulated in Table II. This decrease in peak height is much less pronounced for the base catalyzed samples. These results suggest that PMMA is predominately present as a pure phase in the base catalyzed composites, and thus, a more phase separated system is produced than in the optically transparent acid catalyzed composites, where the motion of the PMMA chains are hindered by their close proximity to the SiO$_2$ network.

TABLE II

DMS Results on PMMA/TEOS Samples

| Sample | Cure Conditions Temp (°C.)/ Time (hrs) | Tan δ, max T, (°C.) 11 Hz | Tan δ, max 11 Hz | LOG (Plateau) Modulus) Dynes/cm$^2$ |
|---|---|---|---|---|
| PMMA | 150/12 | 140 | 1.6 | — |
| PMMA-33B-30 | 90/120 | 110 | 1.3 | — |
| PMMA-33B-30a | 90/97 | 130 | 1.4 | — |
| PMMA-53A-30 | 90/63 | 128 | 0.7 | 8.6–9.0 |
| " | 130/65 | 156 | 0.5 | |
| " | 200/0.5 | 160 | 0.3 | (approx) 9.0 |
| PMMA-33A-30 | 90/63 | 117 | 0.8 | 8.5–9.0 |
| " | 90/120 | 138 | 0.7 | 8.4–8.9 |
| PMMA-33A-19 | 90/63 | 116 | 1.0 | — |
| PMMA-33A-11 | 90/63 | 117 | 0.9 | — |
| " | 160/65 | 147 | 0.67 | — |
| PMMA-24A-30 | 130/18 | 147 | 0.75 | — |
| PMMA-17A-30 | 130/96 | 147 | 1.0 | — |
| " | 90/63 | 117 | 1.0 | — |
| PMMA-11A-30 | 130/15 | 139 | 1.2 | — |

Although samples PMMA-33A-11 and PMMA-33A-19 did not exhibit the presence of a rubberlike plateau above $T_g$, the breadth and magnitude of the Tan δ peaks associated with the $T_g$ of these materials have the same characteristics as did samples PMMA-33A-30 and PMMA-53A-30. This indicates some degree of interpenetration of the PMMA chains with the SiO$_2$ network.

Electron Microscopy

The morphology of the base catalyzed system, PMMA-33B-30, was observed by transmission electron microscopy. The silica phase had spherically shaped silica domains with diameters on the order of 0.1μ to 0.2μ. These particles were aggregated to form clusters which varied in shape and size, and measured 1 to 5μ in diameter. It is noteworthy to recall at this time that the catalyst was added to the PMMA/TEOS solution 16 hours prior to the coating process. Thus, the TEOS was given ample time to polymerize and to develop some structure in the solution itself, which would then influence the morphology developed in the solid state.

The images obtained for the acid catalyzed sample, PMMA-33A-30, revealed a morphology which was very uniform in PMMA/SiO$_2$ composition. Since the sample section was on the order of 500 Å thick, and individual SiO$_2$ domains could not be observed even at the highest magnification, it may be concluded that the inorganic glass domains are most probably smaller than 100 Å. After further curing at 160° C. for 65 hours, some ripening of the inorganic phase occurred but the SiO$_2$ particles size remained too small to be resolved.

When the acid catalyzed systems are coated at temperatures lower than ambient, some interesting changes occur in the development of the final morphology. The size of the glass domains varies from extremely fine particles, as was observed for PMMA-33A-30, on the air surface, to large, elongated particles on the support side, where the major axis of the particle cross-section is on the order of 1 to 2μ in length, and lies parallel to the film support.

Similar SiO$_2$ domain shapes and sizes are observed for PMMA-33A-19-90, although the cross-sectional shapes are more uniformly elliptical. No change was observed in the shape and size of the inorganic phase as these samples were cured at 160° C. for 2½ days.

The three 3-dimensional SiO$_2$ particle shape was obtained for samples PMMA-33A-11-90 and PMMA-33A-19-90. From the results it was concluded that the SiO$_2$ rich domains, present in the acid catalyzed PMMA/TEOS composites coated at low (11° C. and 19° C.) temperature, are essentially disk shape particles which lie parallel to the coating surface. These may result from the collapse, in the thickness direction, of spheres.

The electron micrographs clearly showed that the growth mechanism is different in the acid versus base catalyzed systems. Monitoring the phase separation which occurs in the PMMA matrix is an indirect method of observing this growth process, since it is effectively quenched through vitrification at an intermediate stage of development.

For the acid catalyzed composites coated at elevated temperature, the rate of solvent evaporation is high, and the SiO$_2$ chains do not have time to grow to very high molecular weight prior to vitrification. Thus, phase separation is minimal, although we have seen from the increase in the breadth of the Tan $\delta$ peaks that there is some molecular mixing of the PMMA chains and the SiO$_2$ network. In the case of the base catalyzed PMMA/TEOS sample PMMA-33B-30, the inorganic species have had sufficient time to start their initial growth into isolated SiO$_2$ particles which may aggregate into colloidal suspensions prior to solution coating. Phase separation occurs rapidly as soon as the film is cast and before the system has a chance to vitrify, thus resulting in micron size particles dispersed in the PMMA matrix.

It is well known that during a solution coating process, a solvent concentration gradient will develop through the thickness of the film; there will be a depletion layer at the surface which is in contact with the air. Thus, the effective T$_g$ of the sample will be higher at the air interface than at the support interface where there is a higher concentration of solvent molecules. This is a result of the fact that whereas the solvent remains trapped near the bottom of the film, the solvent leaves the air surface rapidly. This creates a deficiency in solvent in that region which then drives the solvent from the bottom surface towards the top. The net result is that the glass precursors which are near the substrate remain mobile for a longer period of time before vitrification, and therefor larger particles will grow. The initial cure of finite specimens throughout which there may be a gradient in solvent concentration, as in the systems which were cast below room temperature, will result in one side vitrifying before the other. This leads to SiO$_2$ domains which vary in size through the thickness of the film, with the larger SiO$_2$ particles formed near the substrate. One could compensate for this effect, and obtain SiO$_2$ particles with uniform size throughout the film, by saturating the atmosphere above the film with solvent vapor.

The formation of disk-like SiO$_2$ domains lying parallel to the support in samples PMMA-33A-11 and PMMA-33A-19 may also result, to a certain extent, from this concentration gradient. In acidic media, TEOS polymerizes to form extended ramified structures. It is possible that these polymers would adopt a somewhat spherical configuration in solution similar to that adopted by the base catalyzed systems. However, in the acid catalyzed case the individual spheres would be much smaller and much less highly crosslinked. Upon coating and drying the films shrink a great deal due to solvent evaporation, but the shrinkage is principally perpendicular to the substrate since adhesive forces between the substrate and coating restricts shrinkage in the other dimensions. Since the particles produced in the acid catalyzed case are not highly densified, the silicic acid polymer chains can collapse during the shrinkage resulting in the observed disk shaped morphology. During the collapse of the inorganic chains, some PMMA chains will be entrapped. This mechanism would explain the decrease in the Tan $\delta$ peak height which was observed for these samples.

The observation of a high modulus rubber plateau for the hot cast, acid catalyzed composites containing at least 33 mole % SiO$_2$ suggests that there is strong adhesion between the polymer and silica surfaces, where the concentration of residual hydroxide groups is likely to be high at low pH. The latter then act as physical crosslinks.

The magnitude of the observed plateau modulus is on the order of 10$^9$ dynes/cm$^2$ at 250° C. The existence of a rubber plateau above the T$_g$ of the material implies that there is a reinforcing mechanism which persists throughout the sample. This is typically a result of the presence of chemical or physical cross-links, or crystallinity. Since the silica domains are very small, the surface area of the particles is extremely large, thus providing many possible interaction sites. For example, SiO$_2$ particles of 100 Å in diameter will have a surface area of 273 m$^2$/g, whereas SiO$_2$ particles of 0.2$\mu$ in diameter (as observed for the base catalyzed composites) would only have a surface area of 14 m$^2$/g. These calculations assume spherical, non-porous particles with a density of 2.2 g/cc. Actually, the silica phase is far from being fully densified and the SiO$_2$ particles are quite porous. The mechanical behavior of the samples prepared by acid catalysis indicates strong adhesion between the phases, although the exact chemical interactions responsible for this adhesion are unclear at this time. It is clear, however, that two effects dominate the reinforcing nature of the SiO$_2$ phase: the concentration of adhesion points between the PMMA and SiO$_2$ surface, which depends on particle size and concentration, and the chemical character of the surface, which is a function of pH.

The process described above can be extended to the preparation of films having a thickness of from about 1 to about 500 microns. The acrylate or methacrylate binder may be selected from the examples of those polymers mentioned above. The orthosilicate can be selected from tetramethylorthosilicate, tetra(isopropyl)orthosilicate, and tetra(sec-butyl)orthosilicate, and similar substances where the alkoxy group has one to four carbon atoms. The THF solvent employed can be substituted with material(s) selected from the solvents mentioned above. The amount of the dispersed silica phase in the films can be from 10 to 65 weight percent (cal'd. as SiO$_2$) based on the weight of the polymer.

Comparison With Films Made By a Modification of France, 2,048,645

Synthesis of Comparison Material

As taught in the example section in Fr. 2,048,645, a stock solution of polysilicic acid was prepared by mixing 100 ml tetraethoxysilane, 69.5 ml punctilious grade ethanol, and 22.5 ml of a 0.1M HCl solution in a 500 ml round bottom flask. The flask was capped and thoroughly mixed and then allowed to stand, capped, at ambient conditions. Samples were removed from this flask at intervals of 1 day, 15, days, and 30 days as described below.

Following the teachings of the French document, a solution of poly(methyl methacrylate) (LUCITE) in methyl methacrylate monomer was prepared by dissolving 10 g of Lucite 890042 in 40 g of methyl methacrylate monomer. The monomer had been purified by washing with base to remove the inhibitor, drying over calcium carbonate, and then vacuum distilling. It was used immediately. This combination provides an 80% monomer/20% polymer ratio.

After 1 day, 70 ml of the polysilicic acid stock solution was added rapidly dropwise to 600 ml benzene in order to precipitate a concentrated polysilicic acid. This was collected as a colorless, viscous liquid using a separatory funnel. The patent states that this liquid is 53% $SiO_2$, and this was assumed in further calculations. An identical procedure was used to concentrate the polysilicic acid at 15 days (except 70 ml stock was poured into 630 ml benzene) and at 30 days (except 34 ml stock was poured into 300 ml benzene).

The composite formation is set forth in detail for the 15 day sample:

Since a preferred procedure of the instant invention can generate a material which is formally 23 wt. % $SiO_2$, and since this composition is within the range taught by the French patent, the comparison samples were made at 23% $SiO_2$ loadings. Using 20 g of the poly(methyl methacrylate)/methyl methacrylate stock, 5.97 g of $SiO_2$ is required. Assuming the polysilicic acid stock is 53% solids, as taught in the patent, then 11.26 g of this stock is required. Therefore, 11.26 g of polysilicic acid stock, concentrated as described above, was added with stirring to 20 g of the polymer/monomer stock. 0.039 g of lauroyl peroxide (same ratio as in the patent, about 0.15%) was added and dissolved with stirring. Just prior to this addition the sample had been degassed and then placed under an argon atmosphere. The resulting solution was again degassed, placed under an argon atmosphere, and then coated as described below.

The 1 day sample was made in an analogous manner using 9.8 g of concentrated polysilicic acid stock, 17.4 g of the polymer/monomer stock, and 0.034 g of lauroyl peroxide. The 30 day sample used 2.65 g polysilicic acid stock, 4.7 g polymer/monomer stock, and 0.009 g lauroyl peroxide.

Synthesis of Composite of This Invention

The stock solution was prepared as follows: 2.97 g of poly(methyl methacrylate) (LUCITE 890042) was dissolved in 12 g of tetrahydrofuran (THF). To this solution was added 2.97 g of tetraethoxysilane and 1 g of 0.15 m HCl, under constant stirring. The solution was left under ambient conditions for 17 hours.

Coating and Curing

The procedure which follows, and the analysis of these materials was performed identically on both the film of this invention, and the comparison sample.

The resin solutions were either (1) blade coated onto an inert substrate (Kapton) at a temperature of 32° C., or (2) poured into a one inch diameter polyethylene dish.

Each sample was cured in an argon atmosphere for 20 hours at 50° C., followed by 2 hours at 100° C.

Results (1) Visual Appearance:

The film samples of this invention are optically transparent, self-supporting films.

The comparison samples produced from composites made from the procedure of the French Patent, had various degrees of cloudiness, some were white. The coatings did not form good films, they broke up into small pieces during the curing step.

(2) Transmission Electron Microscopy

Transmission electron microscopy was performed on each sample. This measurement gives a picture of the microstructure which is present in the sample. The $SiO_2$ phase will appear dark compared with to the PMMA phase.

Figure 1:
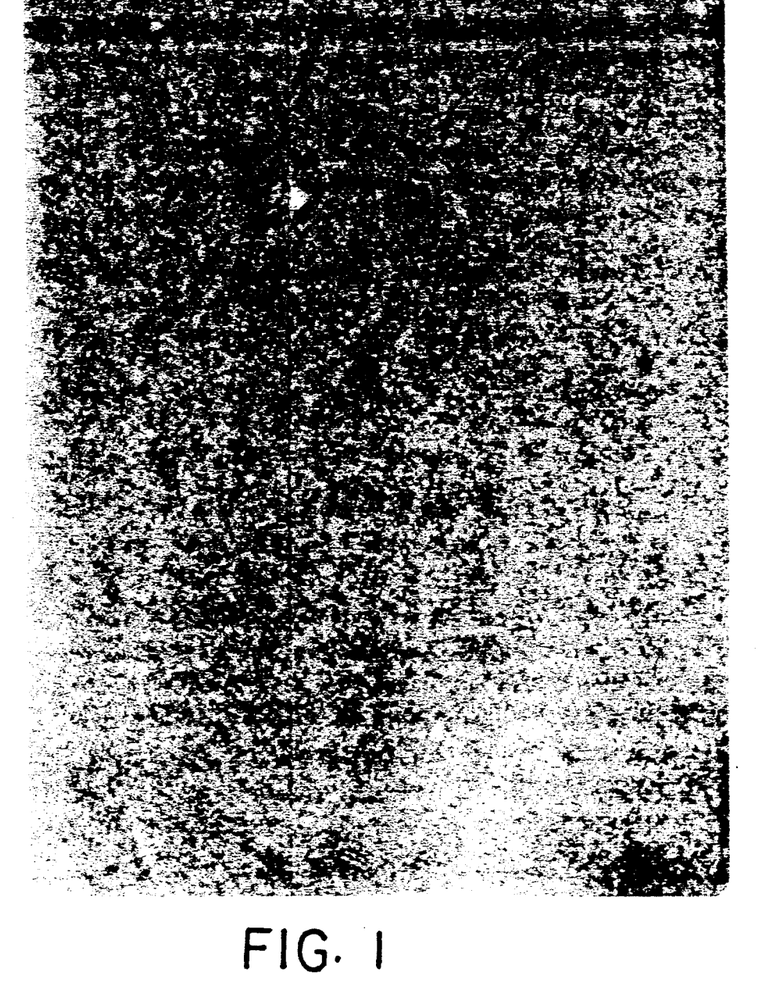
FIG. 1 is a transmission electron micrograph (TEM), at a magnification of about 34,000×, of a composite material prepared from equal weights of poly(methyl methacrylate) (PMMA) and tetraethylorthosilicate (TEOS) according to the procedure of this invention, where the hydrolysis and condensation of the TEOS were acid catalyzed. Dark areas are silicon oxide rich regions. Light areas are PMMA rich regions. A 3.5 mm bar on the photo would correspond to a dimension of 0.1 microns. This also applies to FIGS. 2 and 3.
Figure 2:
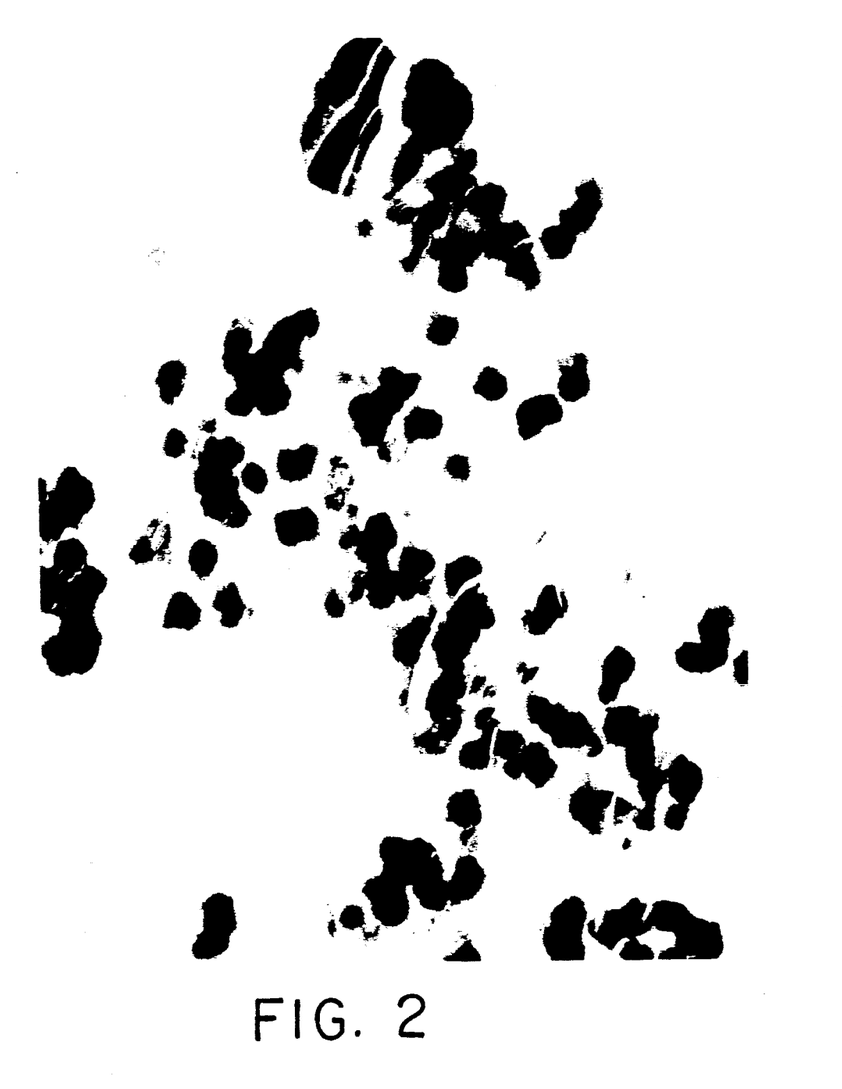
FIG. 2 is a transmission electron micrograph, at a magnification of 34,000×, of the composite material prepared from equal weights of PMMA and TEOS, where the hydrolysis and condensation of the TEOS were base catalyzed. Dark areas are silicon oxide rich regions, grey background is PMMA, and white areas are stressed regions in the sample caused by the sectioning process required for TEM.
Figure 3:
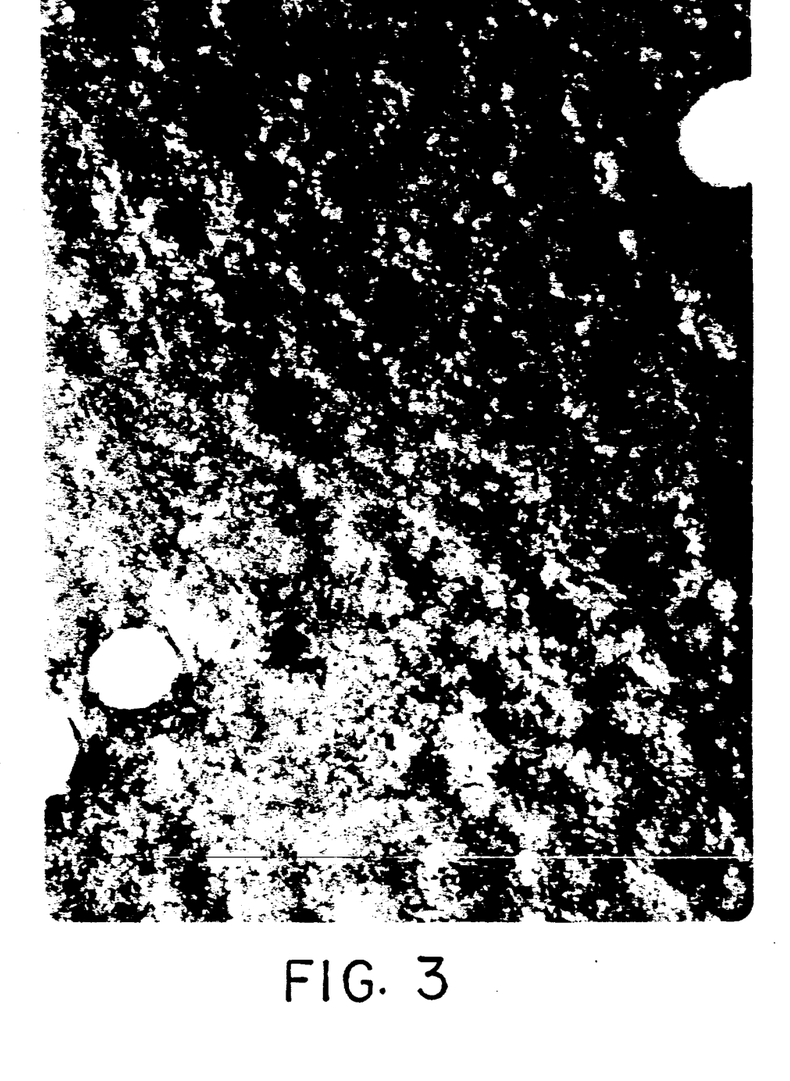
FIG. 3 is a transmission electron micrograph, at a magnification of 34,000×, of a film made from a composite material prepared according to French Pat. No. 2,048,645. Dark areas are silicon oxide rich regions gray areas are PMMA, white circles are holes in the film product. In other words, the holes are in the product per se; they are not an artifact of the TEM process.

All the comparison samples were similar; there were many voids present (the white circles in the FIG. 3) in the samples and there is a lot of phase separation, as seen by the dark/light texture appearance in the photo.

The sample of this invention does not have voids, nor a textured appearance; the $SiO_2$ domains are very small (on the order of 100 Angstroms or less) and are dispersed uniformly throughout the PMMA.

(3) Thermal Gravimetric Analysis (TGA)

TGA was used to determine the final composition of $SiO_2$ in each sample. The weight percent $SiO_2$ is given by the weight of the residue at 700° C. Theoretically, based on the amount of each component put into each sample, all samples should contain about 22 weight percent $SiO_2$ (allow for 2–3 weight percent loss or error in the measurement). The following results were obtained:

(A) Sample of this invention had 19 weight percent residue.

(B) Comparison sample had 46 weight percent residue.

(4) Size Exclusion Chromatography (SEC)

SEC was used to measure the molecular weight of the soluble portion of each sample. It was found that the major fraction of the soluble material corresponds to the LUCITE which is the PMMA used to prepare the samples.

The TGA and SEC results together indicate that, for the comparison samples, only a small portion (ca. 20%) of the MMA monomer initially put in the samples did actually polymerize. The other 80% of the monomer was lost due to evaporation.

The comparative results above show that the teachings of the French Patent cannot be modified to prepare a film in an open system.

The invention has been described in detail above, with particular reference to preferred embodiments. It is to be understood that many substitutions and modifications can be made without departing from the scope and spirit of the claims which follow.

We claim:

1. A free standing, optically clear, film having a thickness of about 1 to about 500 microns, said film consisting essentially of a poly(acrylate) or poly(methacrylate) polymer, having substantially uniformly dispersed therein, particles of an in situ produced, silicon oxide, said particles having a size less than about 0.1 micron; the concentration of said particles in said film being in the range of from about 10 to about 65 weight percent based on the weight of the polymer; said film being further characterized by having no designed covalent linkage between said silicon oxide and said polymer;

said film having been derived by a process comprising (a) hydrolyzing and condensing a tetra(lower alkyl)orthosilicate (i) in the substantial absence of a polymerizable substance other than said silicate, (ii) using acidic hydrolysis, (iii) and using a stoichiometric or substantially stoichiometric amount of water for hydrolysis, (iv) and in an organic solution of said polymer, the solvent in said solution having a relatively low boiling point, a fairly high volatility, and being substantially inert and miscible with water; and (b) subsequently coating the composition thereby produced on a heated non-sticking surface having a temperature of about 30° to about 35° C.; (c) drying and curing the coat on said surface to produce said film; and (d) subsequently removing said film from said surface.

2. A film in accordance with claim 1 wherein said polymer is poly(methyl methacrylate).

3. A film in accordance with claim 2 wherein the concentration of said silicon oxide is from about 20 to about 50 weight percent.

4. Process for the preparation of an optically clear, free standing film, said process comprising (a) hydrolyzing and condensing a tetra(lower alkyl)orthosilicate (i) in the substantial absence of a polymerizable substance other than said silicate, (ii) using acidic hydrolysis, (iii) and using a stoichiometric or substantially stoichiometric amount of water for hydrolysis, (iv) and in an organic solution of a polymer selected from the group consisting of poly(acrylates) and poly(methacrylates), the solvent in said solution having a relatively low boiling point, a fairly high volatility, and being substantially inert and miscible with water; (b) and subsequently coating the composition thereby produced on a heated non-sticking surface having a temperature of about 30° to about 35° C.; (c) drying and curing the coat on said surface to produce said film; and (d) subsequently removing said film from said surface.

5. Process of claim 4 wherein said polymer is poly(methyl methacrylate).

6. The process of claim 4 wherein said orthosilicate is selected from the group consisting of tetramethylorthosilicate and tetraethylorthosilicate.

7. The process of claim 4 wherein the concentration of said polymer in said organic solution is from about 1 to about 50 weight percent.

8. The process of claim 4 wherein the concentration of orthosilicate in said solution is sufficient to yield about 10 to about 65 weight percent (calculated as $SiO_2$) of an inorganic dispersed phase in said film.

9. Process of claim 4 wherein said organic film comprises tetrahydrofuran as a solvent.

* * * * *